(12) United States Patent
Halamik et al.

(10) Patent No.: US 7,321,499 B2
(45) Date of Patent: Jan. 22, 2008

(54) METHOD OF FORMING A POWER SUPPLY CONTROLLER AND DEVICE THEREFOR

(75) Inventors: Josef Halamik, Roznov (CZ); Radim Mlcousek, Frenstat (CZ); Pavel Londak, Hutisko Solanec (CZ)

(73) Assignee: Semiconductor Components Industries, L L C, Phoenix, AZ (US)

( * ) Notice: Subject to any disclaimer, the term of this patent is extended or adjusted under 35 U.S.C. 154(b) by 167 days.

(21) Appl. No.: 11/264,107

(22) Filed: Nov. 2, 2005

(65) Prior Publication Data

US 2007/0096699 A1 May 3, 2007

(51) Int. Cl.
*H02M 3/335* (2006.01)
(52) U.S. Cl. .................. 363/21.1; 363/81; 323/222
(58) Field of Classification Search .... 363/21.1–21.18, 363/41, 97, 19, 80, 95, 81; 323/222, 285
See application file for complete search history.

(56) References Cited

U.S. PATENT DOCUMENTS 4,672,518 A * 6/1987 Murdock .................. 363/21.04
7,099,164 B2 * 8/2006 Zhu et al. ................. 363/21.12

OTHER PUBLICATIONS

"NCP1230A Low-Standby Power Skip Mode Controller," Semiconductor Components Industries, LLC, publication No. NCP1230A/D, Jul. 2005, Rev. 5.
"NCP1217, NCP1217A Enhanced PWM Current-Mode Controller for High-Power Universal Off-Line Supplies," Semiconductor Components Industries, LLC, publication No. NCP1217/D, Sep. 2005—Re;v. 4.
"TL431, A, B, Series, NCV431A Programmable Precision References," Semiconductor Components Industries, LLC, publication No. TL431 /D, Jul. 2005—Rev. 22.

* cited by examiner

*Primary Examiner*—Rajnikant B. Patel
(74) *Attorney, Agent, or Firm*—Robert F. Hightower

(57) ABSTRACT

In one embodiment, a power supply controller uses a ramp signal to form current sense ramp compensation.

20 Claims, 3 Drawing Sheets

METHOD OF FORMING A POWER SUPPLY CONTROLLER AND DEVICE THEREFOR

BACKGROUND OF THE INVENTION

The present invention relates, in general, to electronics, and more particularly, to methods of forming semiconductor devices and structure.

In the past, the electronics industry utilized various methods and structures to form switching power supply controllers that were used to regulate the value of an output voltage. In some applications, the power supply controller used the value of the current through a power switch of the power supply system in order to assist in regulating the value the output voltage. In some operating modes, for example the continuous conduction mode, it was desirable to modify the value of the current sense signal in order to prevent sub-harmonic oscillation in the output voltage. This technique was often referred to as providing current sense ramp compensation. One example of a circuit that provided such current sense ramp compensation was disclosed in the data sheets for devices referred to as the NAP1217 and NAP1230 that were available from ON Semiconductor of Phoenix, Ariz. The prior compensation was difficult to integrate onto a semiconductor die together with a power switching device.

Accordingly, it is desirable to have a method of providing current sense ramp compensation that is integrateable onto a semiconductor die together with a power switching device and a method of providing adjustable current sense ramp compensation that is integrateable onto a semiconductor die together with a power switching device.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. Also, bipolar devices may be used instead of MOS devices. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
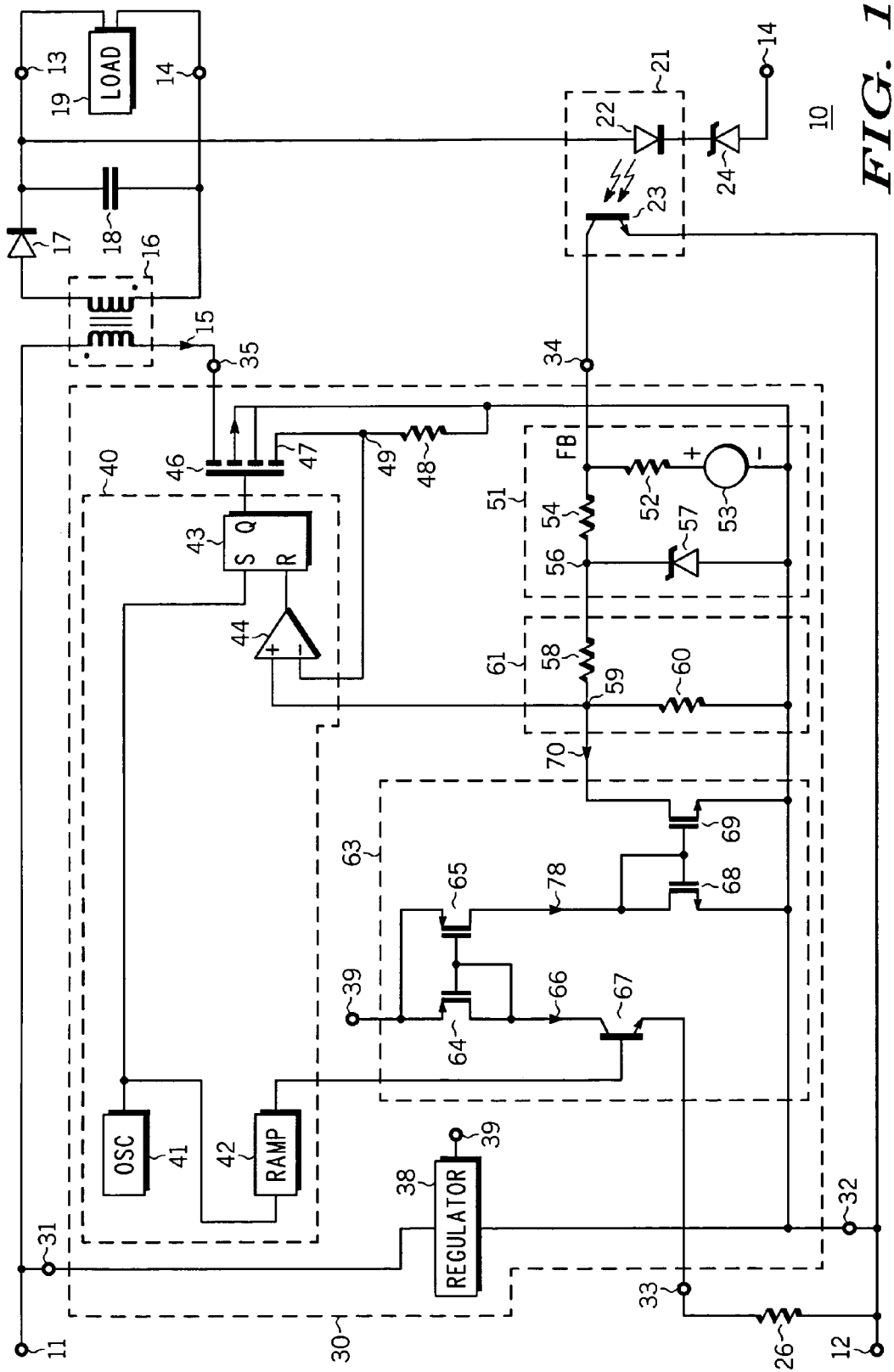
FIG. 1 schematically illustrates a portion of an embodiment of a power supply control system having a power supply controller that illustrates an portion of an exemplary embodiment of ramp compensation in accordance with the present invention.

FIG. 1 schematically illustrates a portion of an embodiment of a power supply system 10 that includes an embodiment of a power supply controller 30 having an exemplary form of current sense ramp compensation. System 10 receives power between a power input terminal 11 and a power return terminal 12, and provides an output voltage to a load 19 between an output terminal 13 and an output return terminal 14. As is well known in the art, the value of the output voltage may vary, such as due to various fluctuations of load 19, thus, controller 30 generally is formed to control the target value of the output voltage within a desired range around the target value. For example, the target value may be five volts and the desired range may be plus or minus five percent of the target five volt value. System 10 generally includes an output transformer 16, a rectifying diode 17, a filter capacitor 18, a feedback device 21, a shunt regulator diode 24, and a ramp compensation resistor 26 that usually are external to controller 30. Feedback device 21 provides a feedback (FB) signal to a feedback input 34 of controller 30. Feedback device 21 typically includes an optical emitter 22 and optical detector such as a photo-transistor 23 that are used to provide the feedback (FB) signal with a value that is representative of the value of the output voltage between terminals 13 and 14. Diode 24 functions as an error amplifier that assist device 21 in forming the feedback (FB) signal. One example of a suitable device for diode 24 is the TL431 available from ON semiconductor of Phoenix Ariz. Feedback networks that include devices such as device 21 and diode 24 are well known to those skilled in the art.

Controller 30 receives an input voltage between a voltage input 31 and a voltage return 32. Controller 30 generally includes a first control circuit or switching control circuit 40, a second control circuit or compensation control circuit 63, a power switch, a feedback control circuit 51, and a modulation circuit 61. In most embodiments, controller 30 also includes an internal regulator 38 that is connected to receive the input voltage between input 31 and return 32 and form an internal operating voltage on an output 39. The internal operating voltage generally is used for operating various elements of controller 30 such as switching control circuit 40 and compensation control circuit 63. In the exemplary embodiment illustrated in FIG. 1, the power switch is implemented as a SenseFET type of power transistor 46 that includes a main transistor section and a sense transistor 47. One example of a SENSEFET type of transistor is disclosed in U.S. Pat. No. 4,553,084 issued to Robert Wrathall on Nov. 12, 1985, which is hereby incorporated herein by reference. SenseFET type of power transistors are well known to those skilled in the art. SENSEFET is a registered trademark of Motorola Inc. of Schaumburg, Ill. Transistor 46 is configured to form a current 15 that flows through transformer 16, through an output 35 of controller 30, and through transistor 46. As current 15 flows through transistor 46, a sense current is induced to flow through sense transistor 47. The induced sense current is representative of the value of current 15 that flows through the main portion of transistor 46 and to return 32. The sense current that flows through transistor 47 also flows through sense resistor 48 and to return 32 thereby inducing a sense signal at a node 49 that is also representative of the value of current 15. In the preferred embodiment, the sense signal is a voltage.

Switching control circuit 40 is configured to form a switching drive signal that operates transistor 46 to control the value of the output voltage. Switching control circuit 40 typically includes an oscillator 41, a ramp generator or ramp 42, a PWM comparator 44, and a PWM latch 43. Oscillator 41 generally is a fixed frequency oscillator that forms a fixed frequency clock signal that is used to set latch 43 and initiate a switching cycle of controller 30. In some embodiments, the oscillator frequency may depend on signals external to controller 30, such as the voltage between terminals 11 and 12, or the output voltage between terminals 13 and 14. Ramp 42 also receives the clock from oscillator 41 and forms a ramp signal. For the exemplary embodiment of controller 30, the positive edge of the clock signal from oscillator 41 also initiates the generation of the ramp signal. Such ramp signals and ramp generators are well known to those skilled in the art.

Figure 2:
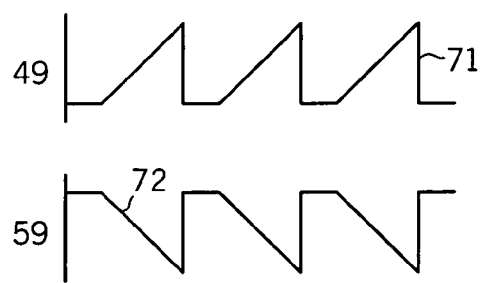
FIG. 2 is a graph having plots of some of the signals of the power supply controller of FIG. 1 in accordance with the present invention.

FIG. 2 is a graph having plots of some signals of controller 30. The abscissa indicates time and the ordinate indicates increasing value of the illustrated signal. A plot 71 illustrates a sense signal formed at node 49, and a plot 72 illustrates a modulated control signal formed at a node 59. The following has references to both FIG. 1 and FIG. 2. As transistor 46 is enabled, the value of current 15 does not instantaneously change but increases at a rate controlled by the voltage from terminal 11 and the primary inductance of transformer 16. The sense current from transistor 47 is representative of current 15, thus, the sense current from transistor 47 also begins at a low value and increases with a substantially ramp waveform as illustrated by plot 71. It has been found that if the duty cycle of the switching drive signal is greater than approximately fifty percent (50%) when controller 30 is operating in the continues conduction code, it is desirable to disable transistor 46 earlier than transistor 46 would normally be disabled. This is typically referred to as current sense ramp compensation. As will be seen further hereinafter, feedback control circuit 51 receives the feedback signal from input 34 and forms a feedback control signal on a node 56. Compensation control circuit 63 provides a compensation signal that is used to modulate the feedback control signal, this the feedback signal, and implement the current sense ramp compensation. Modulation circuit 61 receives the feedback control signal and the modulation signal and forms a modulated control signal at node 59. The modulated control signal is used by comparator 44 to reset latch 43 and negate the switching drive signal thereby disabling transistor 46. Consequently, the modulated control signal and the sense signal are utilized to control the duty cycle of the switching drive signal, thus, the duty cycle of transistor 46. Feedback control circuit 51 includes a voltage source 53, resistors 52 and 54, and a shunt reference diode 57. As is well known to those skilled in the art, diode 57 generally limits the maximum value of the FB control signal on node 56 and hence the maximum value of current 15. Those skilled in the art will appreciate that diode 57 is optional and may be omitted in some embodiments. Diode 57 is not necessary for the operation of circuits 61 and 63. Transistor 23 of feedback device 21 sinks current from voltage source 53. As the value of the output voltage changes, the amount of current flowing from source 53 through transistor 23 also varies which also changes the value of the voltage at node 56. Thus, the value of the feedback control signal at node 56 is representative of the value of the output voltage between terminals 13 and 14. Compensation control circuit 63 receives the ramp signal from ramp 42 and forms a negative ramp waveform that is subtracted from the feedback control signal by modulation circuit 61. Compensation control circuit 63 includes a bipolar transistor 67 that converts the voltage of the ramp signal into a current 66. A base of transistor 67 is coupled to receive the ramp signal. As the value of the ramp signal increases, transistor 67 sources current 66 through an output terminal 33 to external resistor 26. The value of the voltage across resistor 26 plus the base emitter voltage (Vbe) of transistor 67 has to equal the value of the ramp signal applied to the base of transistor 67. Thus, the waveform of current 66 is controlled by the waveform of the ramp signal. Transistors 64 and 65 are configured as a current mirror that forms a current through transistor 65 that is substantially equal to current 66. Transistors 68 and 69 form another current mirror that forms a current 70 that is substantially equal in value to current 66 but that sinks current from node 59. Ramp 42 is configure to form the ramp signal such that the value of the voltage at input 33 is no less than substantially the value of return 32 for the lowest value of the ramp signal. For the embodiment illustrated in FIG. 1, the lowest value of the ramp signal generally is no less than the base-emitter voltage (Vbe) of transistor 69. As the ramp signal from ramp 42 increases from the Vbe of transistor 69, the value of current 70 begins at substantially zero and increases. Transistor 69 sinks current 70 from voltage source 53 through resistors 58 and 54. Consequently, as the value of the ramp signal increases, current 70 increases and forms a negative voltage across resistor 58. The negative voltage formed across resistor 58 has a negative ramp waveform that is similar to the waveform of plot 72. The negative ramp waveform is subtracted from the feedback signal formed by feedback device 21. Thus, as the value of the ramp signal changes, the value of the voltage formed at node 59 also changes. Consequently, circuit 63 forms current 70 and circuit 61 modulates the value of the feedback control signal from node 56 to form the modulated control signal at node 59 as illustrated by plot 72. Comparator 44 compares the sense signal from node 49 with the modulated control signal from node 59 and resets latch 43 to negate the switching control signal. As can be seen from plots 71 and 72, modulating the FB signal with the negative ramp signal causes comparator 44 to disable transistor 46 at lower values of current 15 than would occur without the current sense modulation. Changing the value of resistor 26 adjusts or changes the amount of or level of current sense compensation provided by controller 30 by changing the value of currents 66 and 70 for a given value of the ramp signal. Also, those skilled in the art will appreciate that transistor 67 may be replaced by another element such as an MOS transistor or an operational amplifier. For these alternate embodiments, the minimum value of the voltage at input 33 preferably remains at no less than the value of return 32 to assist in minimizing distortion in currents 66, 78, and 70.

In the preferred embodiment, controller 30 is formed on a semiconductor substrate as an integrated circuit on a semiconductor die. As will be appreciated by those skilled in the art, the value of the sense current formed by transistor 47 generally is very small and it usually is undesirable to route this signal externally to the semiconductor die due to noise and other factors that may disturb the signal. Using compensation control circuit 63 to form current 66 facilitates placing resistor 26 external to the semiconductor die and facilitates using the external resistor to set the amount of compensation provided by controller 30. Using circuit 63 to form current 66 also facilitates using only one terminal of the integrated circuit or one terminal of the semiconductor die to provide the compensation. Positioning resistor 26 external to the semiconductor die facilitates easily changing the value of resistor 26 and easily changing the amount of compensation.

In order to implement this functionality for controller 30, regulator 38 is connected between input 31 and return 32. The clock output of oscillator 41 is connected to the set input of latch 43 and to an input of ramp 42. The output of ramp 42 is connected to the base of transistor 67. The emitter of transistor 67 is connected to output terminal 33 of controller 30. Output terminal 33 is configured to be connected to a first terminal of resistor 26 which has a second terminal connected to terminal 12. The collector of transistor 67 is commonly connected to a drain of transistor 64 and the gates of transistors 64 and 65. A source of transistor 64 is commonly connected to output 39 and a source of transistor 65. A drain of transistor 65 is commonly connected to a drain of transistor 68 and the gates of transistors 68 and 69. The sources of transistors 68 and 69 are connected to return 32. A drain of transistor 69 is commonly connected to node 59, a first terminal of resistor 60, a first terminal of resistor 58, and a non-inverting input of comparator 44. A second terminal of resistor 60 is commonly connected to return 32 and to an anode of diode 57. A cathode of diode 57 is commonly connected to a second terminal of resistor 58, node 56, and a first terminal of resistor 54. A second terminal of resistor 54 is commonly connected to input 34 and a first terminal of resistor 52. A second terminal of resistor 52 is connected to a first terminal of source 53 which has a second terminal connected to return 32. A drain of transistor 46 is connected to output 35. The main source of transistor 46 is connected to a first terminal of resistor 48 and return 32. The sense source of transistor 46 is commonly connected to node 49, a second terminal of resistor 48, and an inverting input of comparator 44. An output of comparator 44 is connected to the reset input of latch 43. The Q output of latch 43 is connected to the gate of transistor 46.

Figure 3:
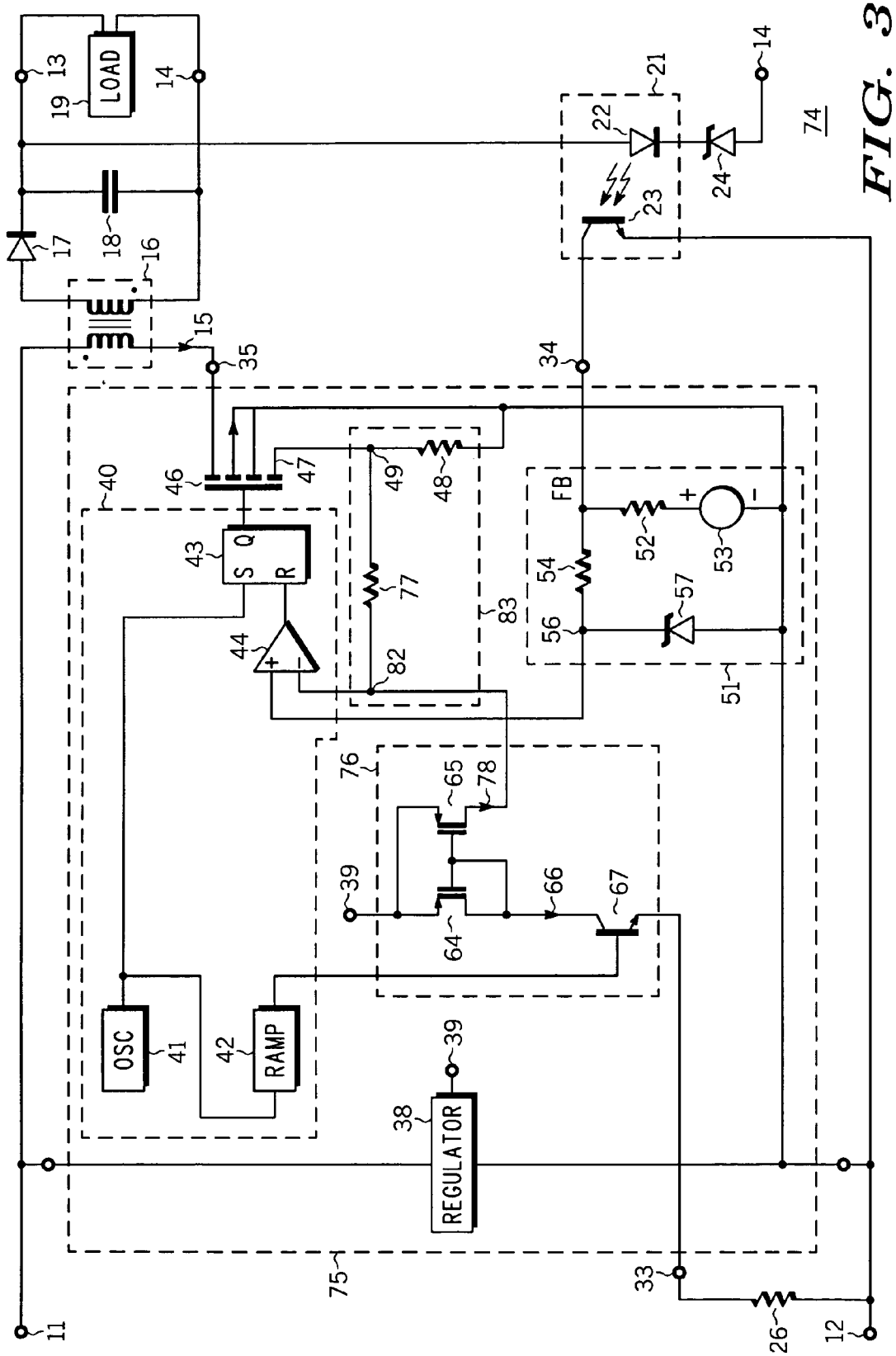
FIG. 3 schematically illustrates a portion of an embodiment of another power supply control system having another power supply controller that illustrates an portion of another exemplary embodiment of ramp compensation in accordance with the present invention.

FIG. 3 schematically illustrates a portion of an embodiment of a power supply system 74 that is an alternate embodiment of system 10 of FIG. 1. System 74 includes an embodiment of a power supply controller 75 that is an alternate embodiment of controller 30 of FIG. 1. Controller 75 illustrates another exemplary form of current sense ramp compensation that is an alternate embodiment of the form described in the description of FIGS. 1 and 2. Controller 75 includes a compensation control circuit 76 that is an alternate embodiment of circuit 63 and a modulation control circuit 83 that is an alternate embodiment of circuit 61. Compensation control circuit 76 forms current 66 similarly to circuit 63. Transistors 64 and 65 form current 78 similarly to circuit 63. Current 78 is formed as a mirror of current 66. Modulation control circuit includes resistors 48 and 77.

Figure 4:
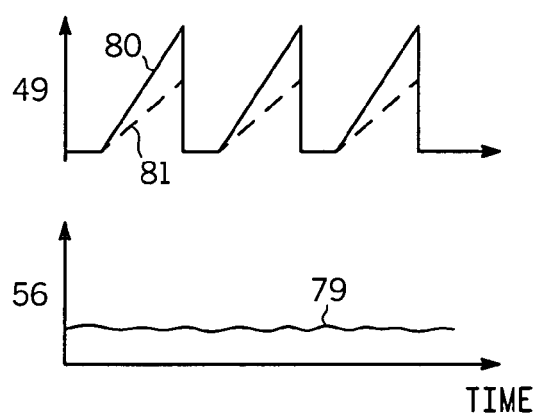
FIG. 4 is a graph having plots of some of the signals of the power supply controller of FIG. 3 accordance with the present invention.

FIG. 4 is a graph having plots of some signals of controller 75. The abscissa indicates time and the ordinate indicates increasing value of the illustrated signal. A plot 79 illustrates the feedback control signal formed at node 59. A plot 81 illustrates the sense signal formed at node 49 by the sense current from transistor 47, and a plot 80 illustrates the modulated control signal formed at a node 82. The following has references to both FIG. 3 and FIG. 4. As the output voltage varies, the value of the voltage on node 56 also varies representatively to the output voltage as illustrated by plot 79. As the value of current 15 increases, the sense current from transistor 47 increases as is illustrated by the dashed line of plot 81. Current 78 varies responsively to the ramp signal and has a positive ramp waveshape. Current 78 flows through resistors 77 and 48. The value of the voltage across resistor 77 is added to the voltage at node 48 and forms the modulated control signal at node 82 as illustrated by plot 80. Thus, the voltage formed by current 65 adds to the sense signal. Comparator 44 is coupled to compare the modulated control signal from node 82 to the feedback control signal from node 59 and negate the switching control signal responsively thereto. Adding current 78 to the sense current from transistor 47 forms the modulated control signal on node 82 to have a larger value thereby disabling transistor 46 for smaller values of current 15.

Figure 5:
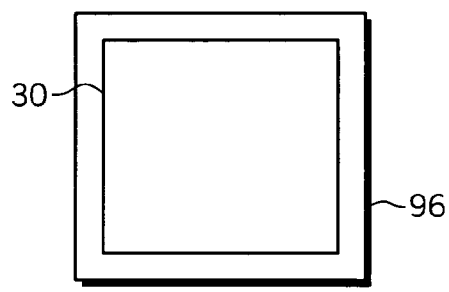
FIG. 5 schematically illustrates an enlarged plan view of a semiconductor device that includes the power controller of FIG. 1 in accordance with the present invention.

FIG. 5 schematically illustrates an enlarged plan view of a portion of an embodiment of an integrated circuit 95 that is formed on a semiconductor die 96. Controller 30 is formed on die 96. Die 96 may also include other circuits that are not shown in FIG. 5 for simplicity of the drawing. Controller 30 and integrated circuit 95 are formed on die 96 by semiconductor manufacturing techniques that are well known to those skilled in the art. Controller 75 may be formed on die 96 instead of controller 30.

In view of all of the above, it is evident that a novel device and method is disclosed. Included, among other features, is a method of forming current sense ramp compensation of an integrated circuit and only using one terminal of the integrated circuit. Additionally, the method facilitates using a SenseFET type of transistor to generate the current sense signal.

While the subject matter of the invention is described with specific preferred embodiments, it is evident that many alternatives and variations will be apparent to those skilled in the semiconductor arts. For example, a couple of ratioed transistors may be used to form the sense current instead of the SenseFET. Additionally, other circuits may be used to translate the ramp voltage to either current 70 or 78 as long as the current is representative of the ramp signal as described herein. The current mirrors of transistors 64 and 65, and 68 and 69 may be replaced with other circuits that perform similar functions. Additionally, other embodiments may use the sense current from transistor 47 as the sense signal instead of the voltage across resistor 48. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A semiconductor device having a power supply controller comprising:
    a power switch;
    a ramp generator configured to form a ramp signal having a periodically occurring period;
    a first control circuit configured to form a switching drive signal having the period to operate the power switch and control an output voltage within a desired range around a target value;
    a feedback circuit configured to form a feedback signal that is representative of the output voltage;
    a current sense circuit configured to from a sense signal that is representative of a current through the power switch;
    a second control circuit operably coupled to modulate one of the feedback signal or the sense signal and form a modulated control signal wherein the second control circuit is configured to use only one terminal of the semiconductor device to set a level of the modulation; and
    the first control circuit operably coupled to use the modulated control signal to control a duty cycle of the switching drive signal.

2. The semiconductor device having the power supply controller of claim 1 wherein the second control circuit receives the ramp signal and forms a control current that modulates a value of the sense signal.

3. The semiconductor device having the power supply controller of claim 2 wherein the second control circuit is configured to use a resistor external to the semiconductor device to establish a value of the control current and wherein the second control circuit is configured to steer the control current through the only one terminal.

4. The semiconductor device having the power supply controller of claim 2 wherein the control current has a ramp shape that is summed with the sense signal.

5. The semiconductor device having the power supply controller of claim 1 wherein the second control circuit receives the ramp signal and forms a control current that modulates a value of the feedback signal.

6. The semiconductor device having the power supply controller of claim 5 wherein the second circuit is configured to form the control current with a negative going ramp shape that is subtracted from the feedback signal.

7. The semiconductor device having the power supply controller of claim 1 wherein the second control circuit includes a first transistor having a control electrode coupled to receive the ramp signal and a first current carrying electrode coupled to the only one terminal of the semiconductor device.

8. The semiconductor device having the power supply controller of claim 7 wherein the feedback signal is modulated to form the modulated control signal and the modulated control signal is compared to the sense signal to control the duty cycle of the power switch.

9. The semiconductor device having the power supply controller of claim 7 wherein the sense signal is modulated to form the modulated control signal and the modulated control signal is compared to the feedback signal to control the duty cycle of the power switch.

10. A method of forming a power supply controller comprising:
    configuring the power supply controller to generate a ramp signal having a period;
    configuring the power supply controller to generate a switching drive signal having the period to control an output voltage to a desired range around a target value
    configuring the power supply controller to receive a feedback signal that is representative of the output voltage and responsively form a feedback control signal that is representative of the feedback signal; and
    configuring the power supply controller to modulate the feedback control signal with the ramp signal to form a modulated control signal.

11. The method of claim 10 further including configuring the power supply controller to form a sense signal that is representative of a current used to form the output voltage during an active portion of the switching drive signal, and configuring the power supply controller to compare the modulated control signal to the sense signal and responsively control a duty cycle of the switching drive signal.

12. The method of claim 10 wherein configuring the power supply controller to generate the switching drive signal includes configuring the power supply controller to generate the ramp signal having the period.

13. The method of claim 10 wherein configuring the power supply controller to modulate the feedback control signal with the ramp signal to form the modulated control signal includes configuring a control circuit of the power supply controller to receive the ramp signal and use a resistor external to the power supply controller to control a level of the modulation of the modulated control signal.

14. The method of claim 10 wherein configuring the power supply controller to modulate the feedback control signal with the ramp signal to form the modulated control signal includes configuring the power supply controller to use the ramp signal to form a first current that is representative of the ramp signal and to use the first current to modulate the feedback signal.

15. The method of claim 14 wherein configuring the power supply controller to use the ramp signal to form the first current that is representative of the ramp signal includes coupling a first control electrode of a first transistor to receive the ramp signal and coupling a first current carrying electrode of the first transistor to an input terminal of a semiconductor device wherein a resistor external to the semiconductor device controls a value of the first current.

16. The method of claim 15 wherein further including forming the semiconductor device to include the first transistor and at least a portion of the power supply controller.

17. A method of forming a semiconductor device having a power supply controller comprising:
    configuring the power supply controller to generate a first ramp signal that repeats with a first period;
    configuring the power supply controller to generate a switching drive signal having the first period to control an output voltage to a desired range around a target value;
    configuring a first control circuit of the power supply controller to receive a feedback signal that is representative of the output voltage;
    configuring the first control circuit to receive a sense signal that is representative of a current used to form the output voltage;
    configuring the power supply controller to modulate a signal selected from the group consisting of the feedback signal or the sense signal with the first ramp signal to form a modulated control signal; and
    configuring the first control circuit to use the modulated control signal to control a duty cycle of the switching drive signal.

18. The method of claim 17 wherein configuring the power supply controller to modulate the signal selected from the group consisting of the feedback signal or the sense signal with the first ramp signal to form the modulated control signal includes configuring the power supply controller to modulate the sense signal and to compare the modulated sense signal to the feedback signal.

19. The method of claim 17 wherein configuring the power supply controller to modulate the signal selected from the group consisting of the feedback signal or the sense signal with the first ramp signal to form the modulated control signal includes coupling a second control circuit to form a modulation signal that is representative of the first ramp signal and to use the modulation signal to modulate the sense signal.

20. The method of claim 19 wherein coupling the second control circuit to form the modulation signal that is representative of the first ramp signal and to use the modulation signal to modulate the sense signal includes forming on a semiconductor die the first control circuit, the second control circuit, and a power switch that is coupled to receive the switching drive signal and further including coupling one terminal of the semiconductor die to use an element external to the semiconductor die to adjust a value of the modulation signal.

* * * * *